(12) United States Patent
Niazi (10) Patent No.: US 8,903,902 B2
(45) Date of Patent: Dec. 2, 2014

(54) FRAMEWORK AND METHOD FOR REAL-TIME EMBEDDED COLLABORATION USING BUSINESS PROCESS AND TRANSACTION CONTEXT

(75) Inventor: Uzair Ahmed Niazi, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1305 days.

(21) Appl. No.: 11/942,917

(22) Filed: Nov. 20, 2007

(65) Prior Publication Data

US 2009/0132653 A1   May 21, 2009

(51) Int. Cl.
| | |
|---|---|
| G06F 15/16 | (2006.01) |
| G06Q 10/10 | (2012.01) |
| G06Q 10/00 | (2012.01) |
| H04L 12/18 | (2006.01) |

(52) U.S. Cl.
CPC ............. *G06Q 10/00* (2013.01); *G06Q 10/103* (2013.01); *H04L 12/1822* (2013.01); *H04L 12/1813* (2013.01)
USPC ............................ 709/204; 709/205; 709/227

(58) Field of Classification Search
CPC ............. G06Q 10/103; H04L 12/1813; H04L 12/1822
See application file for complete search history.

(56) References Cited

U.S. PATENT DOCUMENTS

| | | | |
|---|---|---|---|
| 7,558,834 B2 * | 7/2009 | Embree et al. | 709/207 |
| 7,660,849 B1 * | 2/2010 | Shaffer et al. | 709/204 |
| 2006/0031497 A1 * | 2/2006 | Beartusk et al. | 709/225 |
| 2006/0101098 A1 * | 5/2006 | Morgan et al. | 707/204 |
| 2006/0167941 A1 * | 7/2006 | Huang et al. | 707/104.1 |
| 2007/0049261 A1 * | 3/2007 | Joglekar | 455/416 |
| 2007/0185721 A1 * | 8/2007 | Agassi et al. | 705/1 |
| 2007/0280455 A1 * | 12/2007 | Cai | 379/201.01 |
| 2008/0162565 A1 * | 7/2008 | Waguet | 707/104.1 |
| 2008/0201436 A1 * | 8/2008 | Gartner | 709/206 |

* cited by examiner

*Primary Examiner* — Liangche A Wang
*Assistant Examiner* — Suraj Joshi
(74) *Attorney, Agent, or Firm* — Kilpatrick Townsend & Stockton LLP (57) ABSTRACT

Embodiments of the present invention provide techniques for facilitating collaboration between participants of a process supported by a software application (e.g., a business process supported by a business application). According to one set of embodiments, a request to initiate a collaboration session for a transaction of the process is submitted through a user interface of the process itself within the software application. The collaboration session is then initiated using process and transaction context information retrieved from the software application. In some embodiments, portions of the process and transaction context information are made available to participants in the collaboration session. In further embodiments, the transaction and process context information is used to automatically match the initiator of the collaboration session with one or more appropriate collaboration participants. In this manner, the operational inefficiencies and delays associated with prior collaboration methods may be minimized or avoided.

25 Claims, 7 Drawing Sheets

FRAMEWORK AND METHOD FOR REAL-TIME EMBEDDED COLLABORATION USING BUSINESS PROCESS AND TRANSACTION CONTEXT

BACKGROUND OF THE INVENTION

Embodiments of the present invention relate to collaboration tools, and more particularly relate to techniques for facilitating collaboration between participants of a software-supported process or workflow.

In today's challenging and competitive business environment, organizations are constantly seeking to improve the productivity and efficiency of their business operations. To help achieve this goal, many organizations have invested significant resources in purchasing and implementing business application software (e.g., enterprise resource management (ERP) software, customer relationship management (CRM) software, employee relationship management (ERM) software, etc.). Generally speaking, these applications support the execution of business processes within an organization, thereby improving operational efficiency, adherence to organization policy, and realization of business objectives.

Occasionally, problems may arise in the course of operating of such software that prevent a particular execution instance (i.e., transaction) of a business process from being processed or completed successfully. These problems may occur, for example, if transaction details are incorrectly entered into the software by the originator of the transaction, or if an aspect of the transaction does not adhere to company policy. In these situations, some level of communication or collaboration between participants of the business process is generally required to discuss and resolve the issues.

In current practice, such collaboration is typically handled through manual means, outside of the context of the business application. For example, one business process participant (i.e., the collaboration initiator) may attempt to contact another participant via email, instant message, telephone, or the like to address an issue with a particular transaction. However, this type of manual approach is problematic for several reasons. For example, in order to attempt contact, the collaboration initiator must first switch away from the context of the business application to manually search for the contact information of the other participant (i.e., email address, telephone number, etc.). This process is cumbersome and potentially time-consuming, resulting in operational inefficiencies and delays.

Once the initiator does get in touch with the other participant, the initiator may have a difficult time conveying the context of the transaction or the problem. This is particularly true if the transaction/issue is complex, or if the other participant does not remember many details of the transaction. Thus, additional time may be expended on simply establishing the purpose or nature of the collaboration.

Further, there may be certain scenarios where the collaboration initiator does not know who she should contact in the first instance to resolve a problem with a transaction. For example, consider a situation where a business process end-user needs to contact a business function representative (i.e., a business owner of a step in a business process) to receive clarification on how to initiate a transaction, or to receive information regarding a completed or processed transaction. In many cases, the end-user will not know who to contact in order to address her issues or questions. In some organizations, the end-user may be able to contact a business function helpdesk or service center for guidance. However, the help desk or service center representative may not have the right skills or knowledge to fully resolve the end-user's issue. The end-user would then need to collaborate with another, hopefully more qualified representative, explain the context of the transaction/problem again, etc. This process may be iterated multiple times until the end-user is finally matched with an appropriate representative, thereby reducing the overall efficiency of business operations.

BRIEF SUMMARY OF THE INVENTION

Embodiments of the present invention address the foregoing and other such problems by providing techniques for facilitating collaboration between participants of a process supported by a software application (e.g., a business process supported by a business application). According to one set of embodiments, a request to initiate a collaboration session for a transaction of the process is submitted through a user interface of the process itself within the software application. The collaboration session is then initiated using process and transaction context information retrieved from the software application. In some embodiments, portions of the process and transaction context information (e.g., user interface screens of the process, transactional data, etc.) are made available to participants in the collaboration session. In further embodiments, the transaction and process context information is used to automatically match the initiator of the collaboration session with one or more appropriate collaboration participants. In this manner, the operational inefficiencies and delays associated with prior collaboration methods may be minimized or avoided.

According to one embodiment of the present invention, a method for facilitating collaboration between a plurality of parties, each party in the plurality of parties being a participant in a process supported by a software application, is provided. The method comprises receiving, from a first party in the plurality of parties, a request to initiate a collaboration session regarding a transaction of the process, where the request is submitted by the first party through a user interface of the software application, and where the user interface is associated with a functional step in the process. The method further comprises retrieving, from the software application, first contextual information related to the transaction and second contextual information related to the process. The collaboration session is then initiated using the first contextual information and the second contextual information.

In one set of embodiments, the method above further comprises identifying, based on a first set of rules, a second party in the plurality of parties that should be included in the collaboration session, and sending a request to the second party to join the collaboration session. In some embodiments, the first set of rules are configured to take into account at least a portion of the first contextual information and the second contextual information. In other embodiments, the first set of rules are configured to take into account one or more attributes of the first and second parties.

In another set of embodiments, the method above further comprises determining, based on a second set of rules, a priority for the request sent to the second party. In some embodiments, the second set of rules are configured to take into account at least a portion of the first contextual information and the second contextual information. In other embodiments, the second set of rules are configured to take into account one or more attributes of the first and second parties.

In another set of embodiments, the method above further comprises determining an availability of the second party, and if the second party is not available, creating a collaboration invitation for the second party. In some embodiments, creating a collaboration invitation comprises creating an appointment in a calendar of the second party, and where the appointment includes a reference to at least a portion of the first contextual information and the second contextual information.

According to another embodiment of present invention, a system for facilitating collaboration between a plurality of parties, each party in the plurality of parties being a participant in a process supported by a software application, is provided. The system comprises a collaboration repository configured to store first contextual information related to a transaction of the process and second contextual information related to the process. The system further comprises a collaboration server in communication with the collaboration repository, the collaboration server being configured to receive, from a first party in the plurality of parties, a request to initiate a collaboration session regarding the transaction, where the request is submitted by the first party through a user interface of the software application, and where the user interface is associated with a functional step in the process. In various embodiments, the collaboration server is further configured to retrieve, from the software application, the first contextual information and the second contextual information, and initiate the collaboration session using the first contextual information and the second contextual information.

According to yet another embodiment of the present invention, a machine-readable medium is disclosed, the machine-readable medium having stored thereon a series of instructions which, when executed by a processing component, cause the processing component to facilitate collaboration between a plurality of parties, each party in the plurality of parties being a participant in a process automated by a software application. In various embodiments, the series of instructions cause the processing component to receive, from a first party in the plurality of parties, a request to initiate a collaboration session regarding a transaction of the process, where the request is submitted by the first party through a user interface of the software application, and where the user interface is associated with a functional step in the process. The series of instructions cause the processing component to retrieve, from the software application, first contextual information related to the transaction and second contextual information related to the process, and initiate the collaboration session using the first contextual information and the second contextual information.

A further understanding of the nature and advantages of the embodiments disclosed herein may be realized by reference to the remaining portions of the specification and the attached drawings.

BRIEF DESCRIPTION OF THE DRAWINGS

Various embodiments in accordance with the present invention will be described with reference to the drawings, in which.

In the drawings, the use of like reference numbers in different drawings indicates similar components.

DETAILED DESCRIPTION OF THE INVENTION

In the following description, for the purposes of explanation, numerous specific details are set forth in order to provide an understanding of the present invention. It will be apparent, however, to one skilled in the art that the present invention may be practiced without some of these specific details. In other instances, well-known structures and devices are shown in block diagram form.

Embodiments of the present invention provide techniques for facilitating collaboration between participants of a software-supported process or workflow (e.g., a business process supported by a business application). In one set of embodiments, this collaboration is achieved by embedding a mechanism to initiate a collaboration session within the host application of the process (i.e., the software application supporting the process). This mechanism may then be used to quickly and easily initiate a collaboration session for a specific transaction of the process. In an exemplary embodiment, the collaboration session is created using process and transaction context information retrieved from the host application. As described herein, this context information may be leveraged in various ways to further facilitate the collaboration process.

Embodiments of the present invention may be used in a variety of different domains and contexts. Certain embodiments are particularly applicable to business (i.e., enterprise) software, which is commonly used to support and/or automate the business processes of an organization. However, embodiments of the present invention may be used to facilitate collaboration between participants of any type of software-supported process or workflow. As used herein, a process is a generic term that refers to a set of interrelated functions, or tasks. A transaction is an execution instance of a process.

Figure 1:
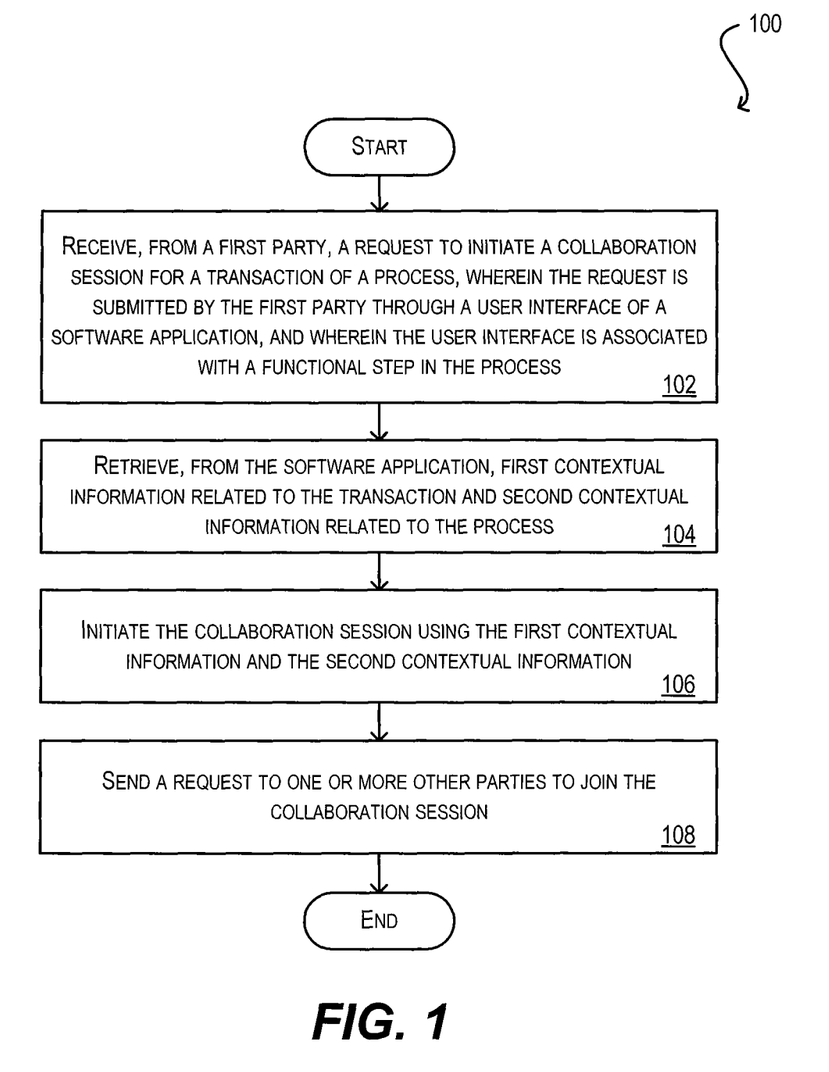
FIG. 1 is a flowchart illustrating the steps performed in facilitating collaboration between participants of a software-supported process in accordance with an embodiment of the present invention.

FIG. 1 is a flowchart 100 illustrating the steps performed in facilitating collaboration between participants of a software-supported process in accordance with an embodiment of the present invention. In various embodiments, the processing of flowchart 100 may be implemented in software, hardware, or combinations thereof. For example, as software, flowchart 100 may be implemented as part of a collaboration framework or platform designed to integrate with various software applications. Further, the software may be stored on a machine-readable medium. As hardware, embodiments of flowchart 100 may be, for example, programmed into a field-programmable gate array (FPGA) or fabricated as an application-specific integrated circuit (ASIC). One of ordinary skill in the art would recognize many variations, modifications, and alternatives.

At step 102, a request is received from a first party to initiate a collaboration session for a transaction of a process.

In various embodiments, the request is received through a user interface of a software application that supports the process (i.e., host application of the process), wherein the user interface corresponds to a functional step in the process. In other words, the collaboration initiation request is received directly from a user interface of the relevant transaction/process within the host application.

At step 104, first contextual information related to the transaction and second contextual information related to the process is retrieved from the host application. The first contextual information may include (but is not limited to) a reference to the process, a current state of the transaction, an audit history of the transaction, and the like. The second contextual information may include (but is not limited to) a definition of the process (e.g., functional steps of the process), a priority of the process, and the like. In one set of embodiments, the first and second contextual information is retrieved from the host application by virtue of a unique transaction identifier included in the collaboration request received in step 102. In other embodiments, the first and second contextual information may be retrieved via other well-known means, or automatically pushed by the host application upon the submission of a collaboration request.

Once the first and second contextual information have been retrieved, the collaboration session is initiated using the first and second contextual information (106). In various embodiments, initiating the collaboration session using the first and second contextual information comprises executing a collaboration application. The collaboration application may be, for example, a video conference application, web conference application, telephone conference application, instant messaging application, or the like. Further, the collaboration application may be executed as a thread or process of the host application, or executed as a standalone application.

In one set of embodiments, the collaboration application may be one of several available collaboration applications. In this case, the collaboration application/method to be used for a particular collaboration session may be selected manually by the first party (e.g., at the time of submitting the collaboration request), or may be selected automatically based on one or more criteria or rules. In one embodiment, the collaboration application may be selected automatically based upon an aspect of the transaction (as provided in the first contextual information) or an aspect of the process (as provided in the second contextual information). For example, certain collaboration methods may be considered particularly appropriate for specific processes or transactions. In another embodiment, the collaboration application may be selected automatically based upon a collaboration preference of the first party.

In some embodiments, the various collaboration applications/methods may be ranked by priority. Additionally, each collaboration application/method may be associated with an availability of each potential participant. For example, if a potential participant is out of the office, the participant may be available to join in a telephone conference (e.g., via mobile phone), but unable to join a video or web conference. In these embodiments, an appropriate collaboration application is selected automatically based on priority and availability. In one embodiment, the highest priority collaboration that is available to all participants at the time of a collaboration initiation request is selected, and the collaboration session is initiated using that selected application. Using this mechanism, the collaboration initiator need not worry about the application/method to be used for collaboration; the application will be determined automatically based upon the real-time availability of the participants for any given collaboration application/method. This also simplifies the user interface request to initiate a collaboration. For example, the first party (i.e., collaboration initiator) may simply issue a "collaborate" request without entering any further information or providing any selections.

In an exemplary embodiment, the collaboration application provides access to at least a portion of the first and second contextual information. For example, in the case of a web conference or an electronic whiteboard application, the collaboration application may provide a collaboration workspace that displays user interface screens, transactional data, and other information exactly as it appears in the host application of the process. In the case of other types of collaboration applications, transaction and process context information may be displayed or presented in a modified form. By providing direct access to this information, participants in the collaboration session may more quickly and easily grasp the context of the transaction/process and understand any outstanding issues.

At step 108, a request is sent to one or more other parties to join in the collaboration session. In one embodiment, the one or more other collaboration participants may be manually identified by the collaboration initiator (i.e., the first party). Alternatively, the one or more other collaboration participants may be automatically identified based on aspects of the transaction, process, and/or the participants themselves. This process of automatically identifying appropriate collaboration participants is described in greater detail below.

Although not shown in flowchart 100, an audit record may be recorded and entered against the transaction/process at the completion of a collaboration session. In various embodiments, the audit record may contain information about any changes made to the transaction (e.g., corrections, modifications, etc.) by the collaboration participants. This type of audit trail may be useful for certification and audit of Sarbanes Oxley compliance of business processes.

Additionally, each collaboration session may be recorded and logged in a collaboration repository. This collaboration recording may be used for a variety of purposes, such as for training new business function representatives or for data mining. In some embodiments, various metrics derived from recorded collaboration sessions (e.g., time to completion, number of participants, problem type, etc.) may be analyzed and used to identify systemic problems with a particular process. The process may then be re-engineered to become more efficient and/or effective.

It should be appreciated that the specific steps illustrated in FIG. 1 provide a particular method for facilitating collaboration according to an embodiment of the present invention. Other sequences of steps may also be performed according to alternative embodiments. For example, alternative embodiments of the present invention may perform the steps outlined above in a different order. Moreover, the individual steps illustrated in FIG. 1 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 2A:
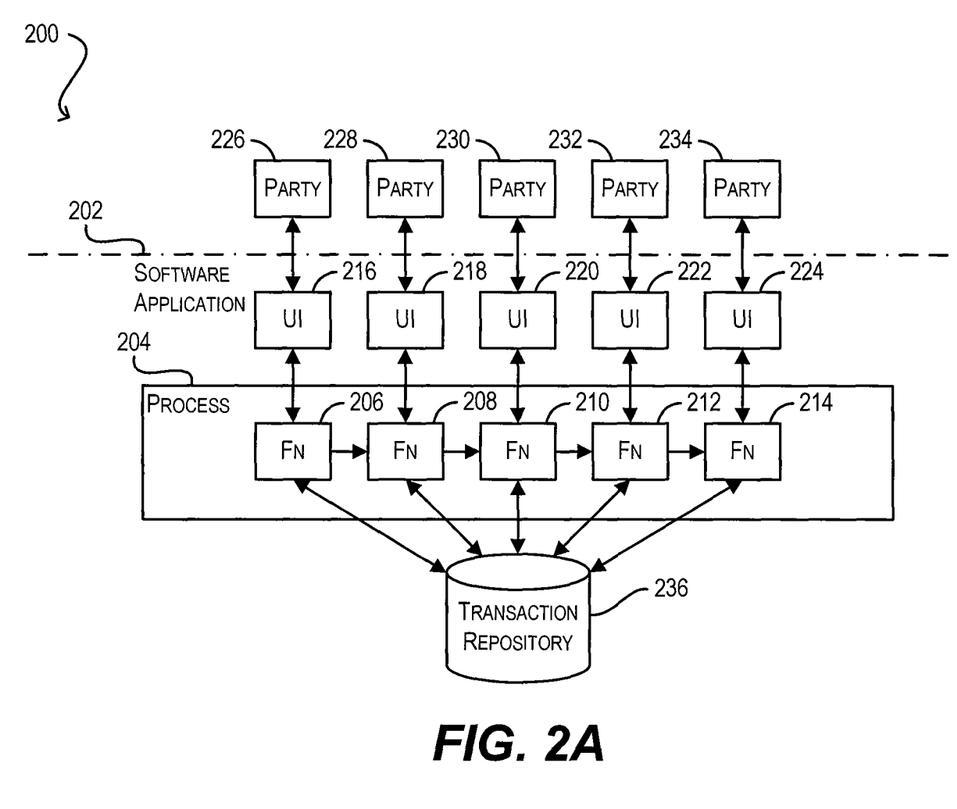
FIG. 2A is a simplified block diagram illustrating an exemplary software application that may be used in accordance with an embodiment of the present application.

FIG. 2A is a simplified block diagram 200 illustrating a software application 202 that may be used in accordance with an embodiment of the present invention. Specifically, application 202 corresponds to an exemplary host application of a process as discussed with respect to FIG. 1. Application 202 implements, or supports, a process 204 that comprises five functional steps 206, 208, 210, 212, 214. Each functional step corresponds to a task, or function of process 204. Although only five functional steps are depicted, any number of functional steps may be supported.

As shown, each functional step is associated with a user interface 216, 218, 220, 222, 224. In various embodiments, user interfaces 216, 218, 220, 222, 224 include UI elements that enable users (e.g., parties 226, 228, 230, 232, 234) to enter, validate, or otherwise manage transactional data pertaining to steps 206, 208, 210, 212, 214. The transaction data is stored in transaction repository 236. In an exemplary embodiment, user interfaces 216, 218, 220, 222, 224 also include an embedded mechanism (e.g., button, hypertext link, etc.) for generating a collaboration initiation request for a given transaction of process 204. The collaboration initiation request generated via this mechanism is used to create a collaboration session in accordance with embodiments of the present invention.

Figure 2B:
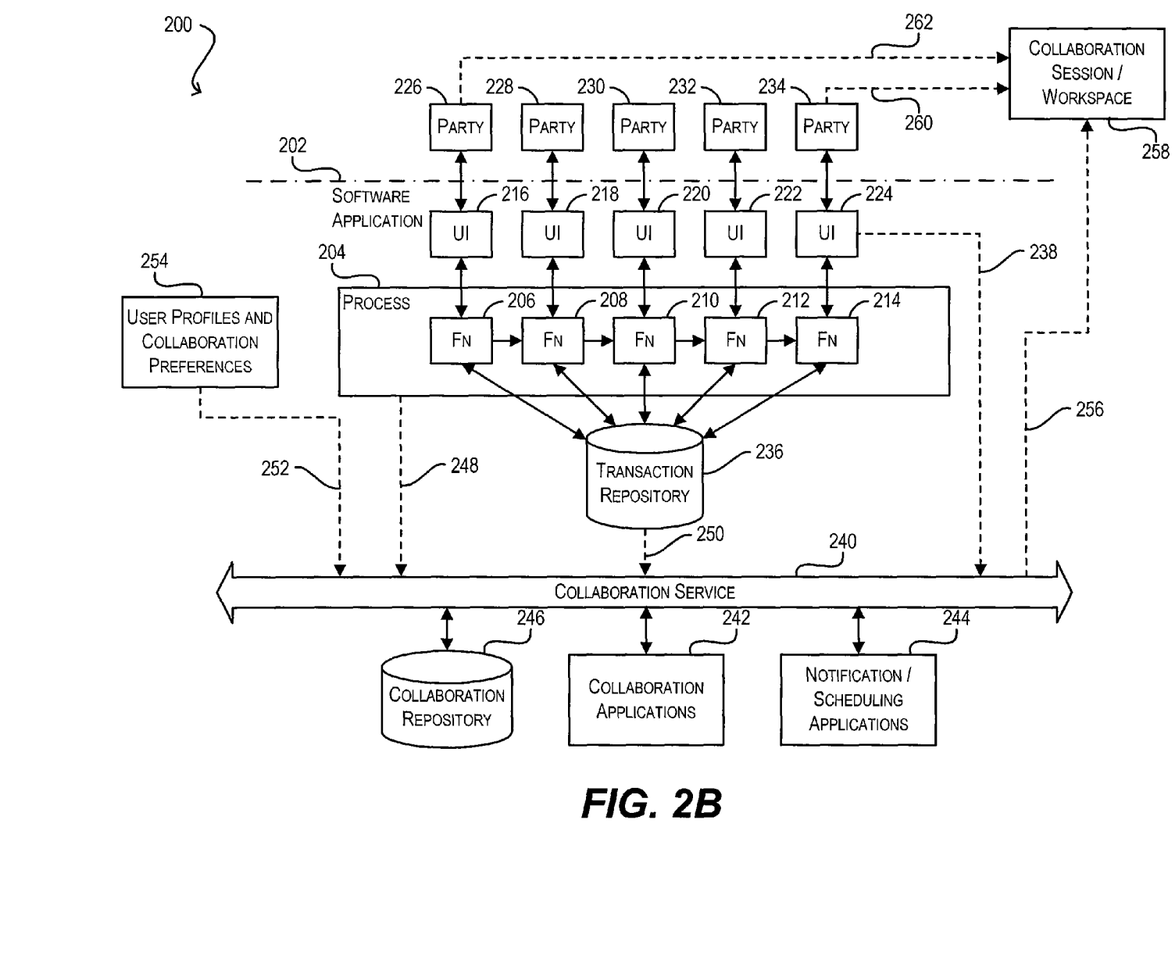
FIG. 2B is a simplified block diagram illustrating a collaboration framework in accordance with an embodiment of the present invention.

FIG. 2B is a simplified block diagram illustrating software application 202 of FIG. 2A in the context of a collaboration framework in accordance with an embodiment of the present invention. The collaboration framework includes a collaboration service or engine 240, which is configured to interact with a plurality of collaboration applications 242, a plurality of notification/scheduling applications 244, and a collaboration repository 246. In one set of embodiments, collaboration service 240, collaboration applications 242, notification/scheduling applications 244, and collaboration repository 246 may be integrated into host application 202. Alternatively, these collaboration components may be implemented as standalone modules/applications adapted to interoperate with application 202, as well as with any number of other applications.

As described above, collaboration applications 242 are used to initiate a collaboration session, and may include a web conference application, video conference application, and the like. Notification/scheduling applications 244 are used to coordinate and schedule future collaboration sessions between collaboration participants. This feature is discussed in greater detail with respect to FIG. 3 below. Collaboration repository 246 is configured to store any data utilized by collaboration service 240 or the other collaboration components. For example, collaboration repository 246 may store audit records of transactions, recordings of completed collaboration sessions, and any business rules used to facilitate collaboration.

In various embodiments, collaboration service 240 is configured to receive a request to initiate a collaboration for a transaction of process 204 via one of the user interfaces 216, 218, 220, 222, 224. In the example shown, a request 238 is received from party 234 through user interface 224. Once the request is received, collaboration service 240 retrieves the context of the current transaction from transaction repository 236 (indicated by 250) and the context of the process from process 204 (indicated by 248). Collaboration service 240 may also retrieve user profiles and/or collaborations preferences for one or more of the parties 226, 228, 230, 232, 234 from profile component 254 (indicated by 252).

A collaboration session or workspace 258 is then created by executing one or more of the collaboration applications 242. As discussed with respect to flowchart 100, collaboration session 258 is created using the transaction and process context retrieved from transaction repository 236 and process 204. Accordingly, at least a portion of the transaction and process context may be made available to participants within the session, thereby aiding the participants in understanding the context of the collaboration and any outstanding issues. Of course, the collaboration initiator (party 234) is allowed to join the collaboration session (indicated by 260). Further, one or more additional parties, such as party 226, may be invited to participate in the session (indicated by 262).

Figure 3:
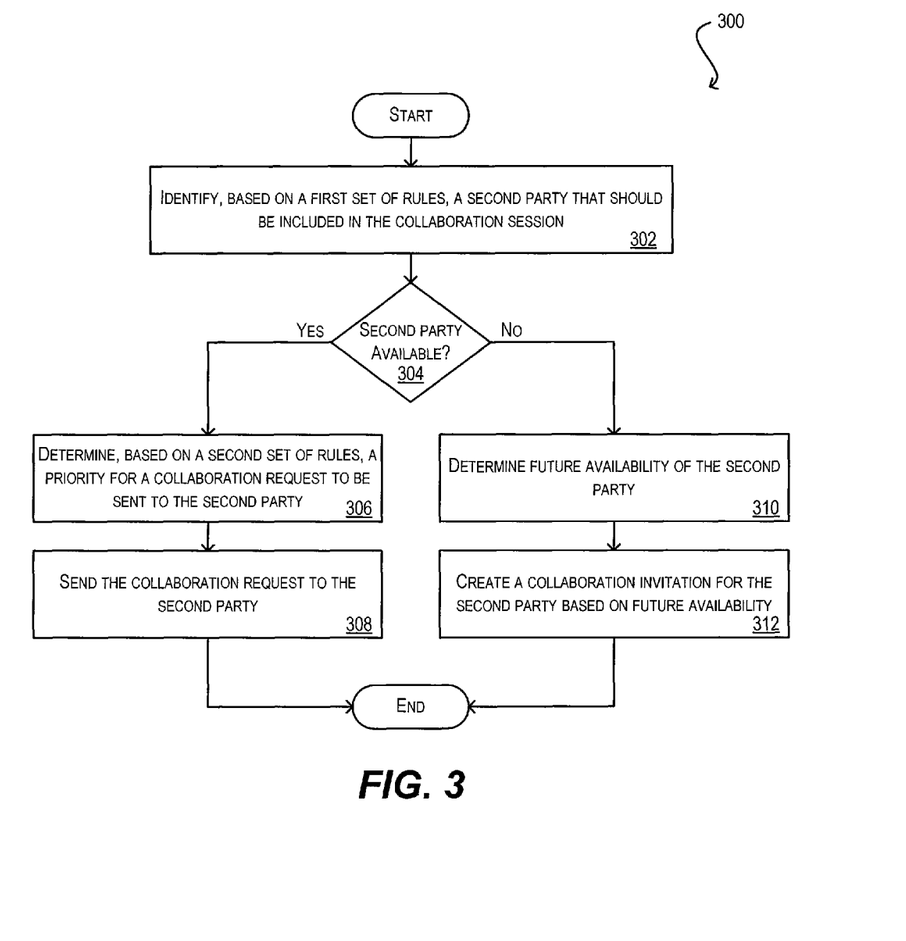
FIG. 3 is a flowchart illustrating additional steps performed in facilitating collaboration between participants of a software-supported process in accordance with an embodiment of the present invention.

FIG. 3 is a flowchart 300 illustrating additional steps that may be performed in facilitating collaboration between participants of a software-supported process in accordance with an embodiment of the present invention. In particular, flowchart 300 illustrates processing that may be performed to automatically match a collaboration initiator with one or more appropriate collaboration participants, and to handle situations in which an identified participant may not be immediately available for a real-time collaboration session. In various embodiments, flowchart 300 may be implemented in software, hardware, or combinations thereof. For example, as software, flowchart 300 may be implemented as part of a collaboration framework or platform designed to integrate with various software applications. Further, the software may be stored on a machine-readable medium. As hardware, embodiments of flowchart 300 may be, for example, programmed into a field-programmable gate array (FPGA) or fabricated as an application-specific integrated circuit (ASIC). One of ordinary skill in the art would recognize many variations, modifications, and alternatives.

At step 302, a second party that should be included in a collaboration session is identified, wherein the identification is performed based on a first set of rules (e.g., criteria). In this manner, the most appropriate collaboration participants for the session may be automatically selected without having to manually determine their identities or contact information, thereby improving the overall operational efficiency of the collaboration process. In one set of embodiments, the first set of rules take into account a portion of the transaction context and/or process context that is passed into the collaboration session. For example, participants may be selected based on who was previously involved in the transaction (e.g., determined from the audit history of the transaction), or based on ownership of the functional step in which the session was initiated (e.g., determined from the definition of the process). Additionally, participants may be selected based on their upstream/downstream roles in the process (e.g., determined from the process context). For example, the collaboration initiator may need to collaborate with upstream or downstream business function representatives to ensure that the transaction can be completed successfully and efficiently.

In further embodiments, the first set of rules may be configured to match one or more attributes of the first and second parties. These attributes may be determined from user profile component 254 of FIG. 2B, or may be embedded in the host application of the process. By way of example, the first and second parties may be matched based on skill level, experience, grade, seniority, or the like. This type of matching increases the likelihood that the selected collaboration participants will have the ability to adequately resolve the collaboration initiator's problem. In some embodiments, the first set of rules may be user-definable by, for instance, an administrator of collaboration service 240. In other embodiments, the rules for participant selection/matching may be predetermined for a given functional department, process type, or transaction type. One of ordinary skill in the art would recognize many variations, modifications, and alternatives.

In one set of embodiments, potential participant sets are dynamically maintained for each process and transaction of an application. These participant sets define the potential pool of parties that may be invited into a given collaboration based on the first set of rules described above. Participants sets are discussed in greater detail with respect to FIG. 4 below.

Once a second party has been identified, the availability of the second party is determined (304). If the second party is available, a collaboration request is created. The collaboration request is configured to notify the second party of the collaboration session, and to invite the second party to join the session. In some embodiments, the collaboration request may be prioritized based on a second set of rules (306). This prioritization enables a potential participant that receives a large number of simultaneous or near-simultaneous collaboration requests to determine which session she should join first. Like the first set of participant selection rules from step 302, the second set of prioritization rules may take into account a portion of the transaction context, the process context, and/or one or more attributes of the first and second parties. For example, the priority of a collaboration request may be based on the seniority of the collaboration initiator, the priority of the process, or the like. One of ordinary skill in the art would recognize many variations, modifications, and alternatives.

As shown in FIG. 3, prioritization (306) may be separate from participant identification/matching (302). In alternative embodiments, however, prioritization may be subsumed into participant identification/matching. In other words, participants may be identified/matched in a manner that already takes into account the priority of the collaboration session. In these situations, step 306 may be removed.

At step 308, the collaboration request is sent to the second party. If the second party accepts the request and joins the session, the first and second parties will be able to engage in real-time collaboration to resolve any outstanding issues regarding the transaction/process.

If the second party is not available, then a future availability of the second party may be determined (310). In an exemplary embodiment, this is determined via one or more notification/scheduling applications (e.g., 244 of FIG. 2B) that are accessible to collaboration service 240. For example, collaboration service 240 may access an appointments calendar application and determine the next time slot in which the second party is available to join a collaboration session. A collaboration invitation (e.g., calendar appointment) may then be created for the second party based on that time slot (312).

In one set of embodiments, the collaboration invitation includes information derived from the context of the transaction and/or process. This enables the second party to easily understand the nature and purpose of the requested collaboration by simply reviewing the invitation. In some cases, the invitation may also include a direct link (e.g., URL or hypertext link) to the relevant user interface of the host application and/or the collaboration workspace. For example, the link may be a "click to dial" link that automatically initiates a conference call with the appropriate participants. In another embodiment, the link may be a hypertext link that launches a web conference session and then connects the participants to that session. In yet another embodiment, the link may initiate a video conference and connect the participants to that video conference session. In this manner, the second party may join the collaboration session at the appropriate time by simply clicking on the link in the invitation. This avoids the inefficiencies and delays involved in logging into a separate application to engage in collaboration.

In certain embodiments, the duration of the collaboration invitation may be automatically determined based on metrics stored in collaboration repository 246 of FIG. 2B. For instance, the duration may be based on the durations of previous collaboration sessions for that particular transaction, for that process type, or the like. One of ordinary skill in the art would recognize many variations, modifications, and alternatives.

Although not shown in FIG. 3, the first party may also create a recorded inquiry for the second party if the second party is unavailable. The recorded inquiry may be a voicemail, an email, a recording of user interface navigation in the host application, or any other type of recorded communication that is configured to convey the nature of the collaboration request to the second party. The recording may then be reviewed asynchronously by the second party at a later point in time, either within or outside the context of the host application of the process.

It should be appreciated that the specific steps illustrated in FIG. 3 provide a particular method for facilitating collaboration according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
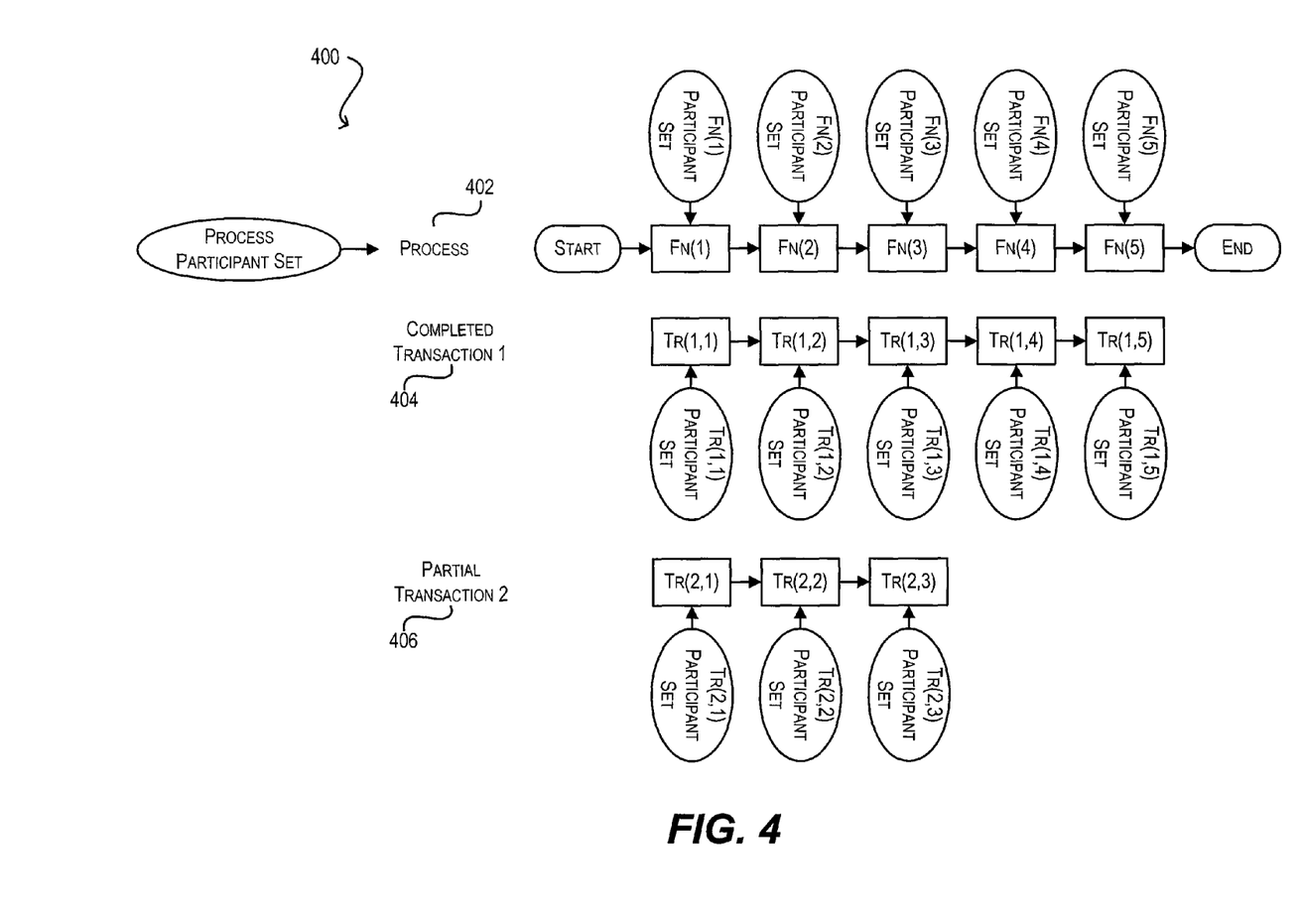
FIG. 4 is a simplified block diagram illustrating participant sets for a collaboration session in accordance with an embodiment of the present invention.

FIG. 4 is a simplified block diagram 400 illustrating participant sets for a collaboration session in accordance with an embodiment of the present invention. As described with respect to FIG. 3, a participant set is a pool of parties from which potential collaboration participants are selected. In one set of embodiments, these participant sets are dynamically maintained by collaboration service 240. As shown, diagram 400 depicts a process 402 comprising five functional steps FN(1), FN(2), FN(3), FN(4), FN(5). Diagram 400 also depicts two transaction instances of process 402: a completed transaction 1 (404) comprising five completed transaction steps TR(1,1), TR(1,2), TR(1,3), TR(1,4), TR(1,5), and a partial transaction 2 (406) comprising three completed transaction steps TR(2,1), TR(2,2), TR(2,3).

In various embodiments, each functional step of process 402 and each transaction step of transactions 404, 406 may have their own unique set of participants. For example, the participants of step FN(1) for transaction 404 (i.e., the TR(1, 1) participant set) may be different from the participants of the same step FN(1) for transaction 406 (i.e., the TR(2,1) participant set). In some embodiments, this difference may result from the values/actions contained in the context of each transaction. For example, transaction 404 may correspond to an expense request for $100, and transaction 406 may correspond to an expense request for $1500. If the organization's policy requires that any expense request over $1000 be processed at step FN(1) by a different team (e.g., set of participants) than expense requests under $1000, the parties in the TR(1,1) participant set and the TR(2,1) participant set will differ.

Each functional step FN(X) of process 402 may also have its own set of participants that is independent of any transaction of process 402. For example, these participants may correspond to the functional owners of each step. Further, process 402 may have its own process participant set. By defining separate, independent participant sets at the process level, collaboration sessions can be carried out for processes rather than transactions. These sessions may be used, for instance, to view the history of transactions for the process and identify potential bottlenecks. When a bottleneck is identified, the process definition/workflow may be modified by the functional owners to streamline its operation.

Figure 5:
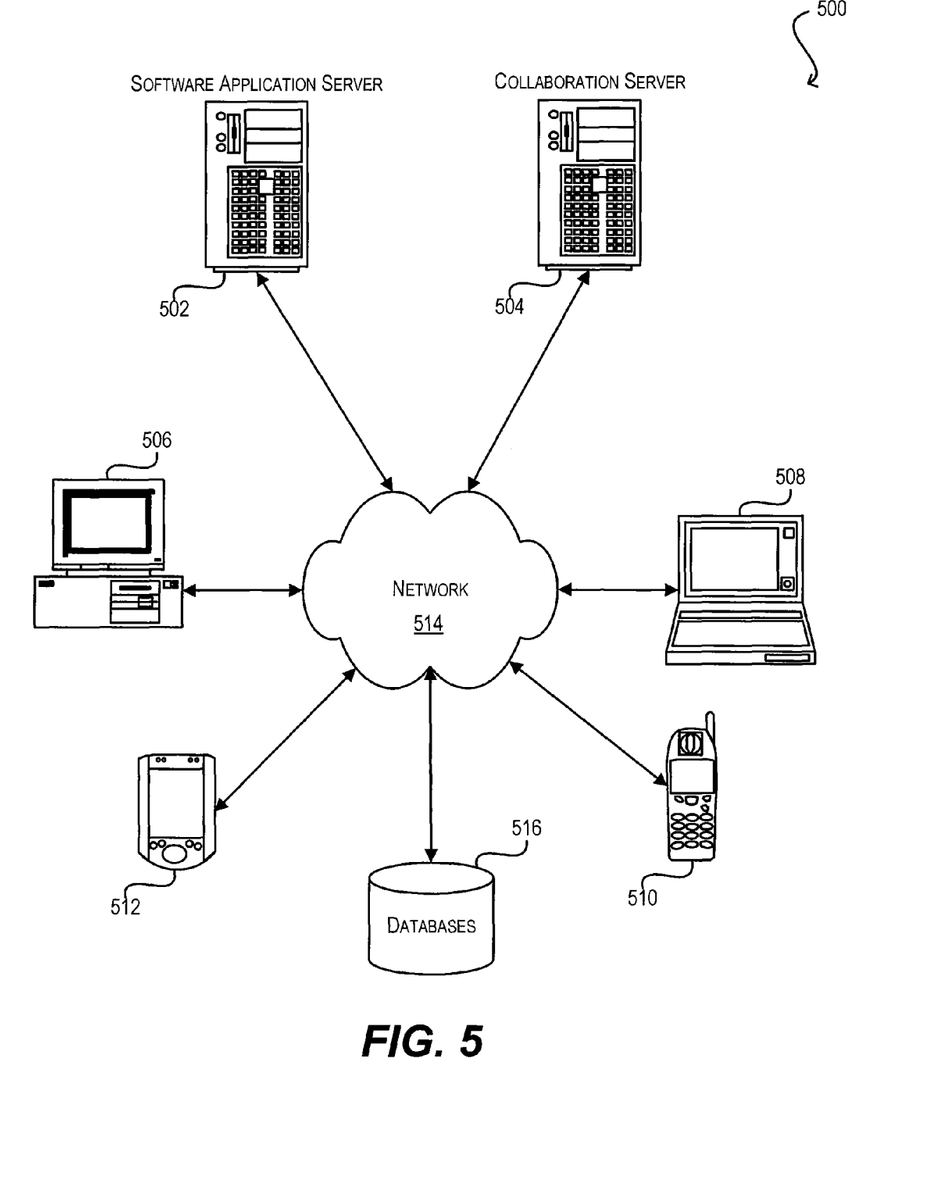
FIG. 5 is a simplified block diagram of a system environment that may be used in accordance with an embodiment of the present invention.

FIG. 5 is a simplified block diagram illustrating components of an exemplary system environment 500 that may be used in accordance with an embodiment of the present invention. As shown, system environment 500 includes one or more client computing devices 506, 508, 510, 512, which are configured to operate a client application such as web browser, proprietary client (e.g., Oracle Forms), or the like. In various embodiments, client computing devices 506, 508, 510, 512 are used by parties 226, 228, 230, 232, 234 of FIGS. 2A and 2B to interact with business application 202. For example, client computing devices 506, 508, 510, 512 may be used to view user interfaces 216, 218, 220, 222, 224. Additionally, client computing devices 506, 508, 510, 512 may be used to initiate and/or participate in a collaboration session such as collaboration session 258.

Client computing devices 506, 508, 510, 512 may be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 506, 508, 510, 512 may be any other electronic device, such as a thin-client computer, Internet-enabled gaming system, and/or personal messaging device, capable of communicating over a network (e.g., network 514 described below). Although exemplary system environment 500 is shown with four client computing devices, any number of client computing devices may be supported.

In most embodiments, system environment 500 includes a network 514. Network 514 may be any type of network familiar to those skilled in the art that can support data communications using any of a variety of commercially-available protocols, including without limitation TCP/IP, SNA, IPX, AppleTalk, and the like. Merely by way of example, network 514 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 500 also includes one or more server computers 502, 504 which may be general purpose computers, specialized server computers (including, merely by way of example, PC servers, UNIX servers, mid-range servers, mainframe computers rack-mounted servers, etc.), server farms, server clusters, or any other appropriate arrangement and/or combination. In various embodiments, one or more of the servers 502, 504 may be adapted to run one or more services or software applications described in the foregoing disclosure. For example, as shown in FIG. 5, server 502 may act as a software application server configured to execute host application 202 of FIGS. 2A and 2B. Server 504 may act as a collaboration server configured to execute collaboration service 240 and one or more collaboration or notification/scheduling applications 242, 244.

Each server 502, 504 may run an operating system including any of those discussed above, as well as any commercially available server operating system. Servers 502, 504 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 500 may also include one or more databases 516. For instance, databases 516 may include an application database configured to store transactional data for an application (such as transaction repository 236 of FIGS. 2A and 2B), a collaboration database configured to store configuration data and business rules for a collaboration service (such as collaboration repository 246), as well as any other type of database or data storage component described in this disclosure. Databases 516 may reside in a variety of locations. By way of example, one or more of databases 516 may reside on a storage medium local to (and/or resident in) one or more of the computers 502, 504, 506, 508, 510, 512. Alternatively, databases 516 may be remote from any or all of the computers 502, 504, 506, 508, 510, 512, and/or in communication (e.g., via network 514) with one or more of these. In one set of embodiments, databases 516 may reside in a storage-area network (SAN) familiar to those skilled in the art. Similarly, any necessary files for performing the functions attributed to the computers 502, 504, 506, 508, 510, 512 may be stored locally on the respective computer and/or remotely, as appropriate. In one set of embodiments, databases 514 may include relational databases, such as Oracle 10g, that are adapted to store, update, and retrieve data in response to SQL-formatted commands.

Figure 6:
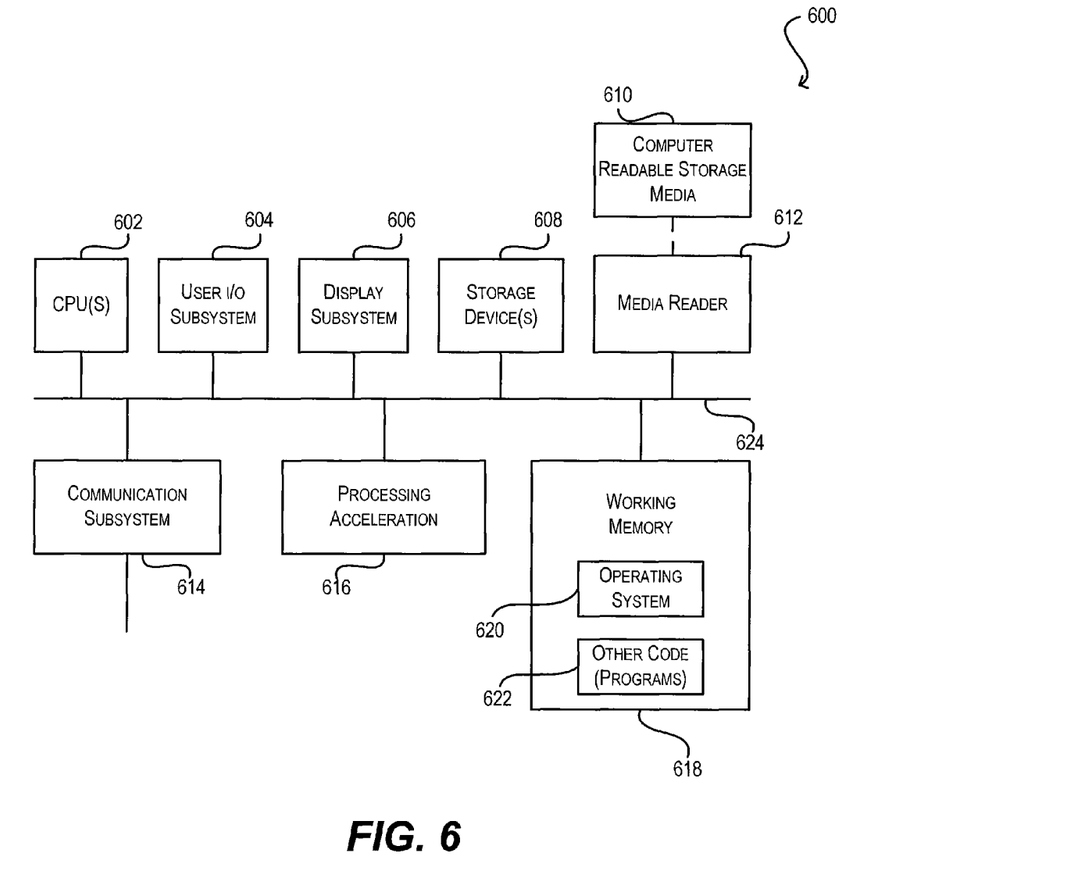
FIG. 6 is a simplified block diagram of a computer system that may be used in accordance with an embodiment of the present invention.

FIG. 6 illustrates an exemplary computer system 600 that may be used in accordance with embodiments of the present invention. In various embodiments, system 600 may be used to implement any of the computers 502, 504, 506, 508, 510, 512 described above. Computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). Computer system 600 may also include one or more storage devices 608. By way of example, the storage device(s) 608 may include devices such as disk drives, optical storage devices, and solid-state storage devices such as a random access memory (RAM) and/or a read-only memory (ROM), which can be programmable, flash-updateable and/or the like.

Computer system 600 may additionally include a computer-readable storage media reader 612, a communications subsystem 614 (e.g., a modem, a network card (wireless or wired), an infra-red communication device, etc.), and working memory 618, which may include RAM and ROM devices as described above. In some embodiments, computer system 600 may also include a processing acceleration unit 616, which can include a digital signal processor (DSP), a special-purpose processor, and/or the like.

Computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing computer-readable information. Communications system 614 may permit data to be exchanged with network 516 and/or any other computer described above with respect to system environment 500.

Computer system 600 may also comprise software elements, shown as being currently located within working memory 618, including an operating system 620 and/or other code 622, such as an application program (which may be a client application, Web browser, mid-tier application, RDBMS, etc.). It should be appreciated that alternative embodiments of computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for facilitating collaboration between a plurality of parties, each party in the plurality of parties being a participant in transactions of an enterprise application, the method comprising:
    generating, by a computer system, a user interface of a the enterprise application, the user interface being associated with a current functional step of a business process executed by the enterprise application and being generated in response to completion of a prior functional step of the business process;
    receiving, by the computer system from a first party in the plurality of parties, a request to initiate a collaboration session for a transaction of the business process, the transaction being an execution instance of the business process, the request being submitted by the first party through the user interface of the enterprise application, wherein the plurality of participants comprises a set of potential participants in the transaction and wherein members of the set of potential participants are maintained dynamically for each transaction and each business process executed by the enterprise application;
    retrieving, by the computer system, first contextual information related to the transaction and identifying the current functional step, and second contextual information including a definition of the business process, wherein the first contextual information related to the transaction includes an audit history of the transaction, the audit history identifying previously completed functional steps and previously involved participants in the transaction for each completed functional step, and wherein members of the set of potential participants are maintained dynamically based on the audit history; and
    initiating, by the computer system, the collaboration session from the enterprise application executing the business process using the first contextual information and the second contextual information, wherein initiating the collaboration session from the enterprise application executing the business process using the first contextual information and the second contextual information comprises launching a collaboration application, and wherein the collaboration application provides a collaborative workspace providing access to at least a portion of the first contextual information and the second contextual information.

2. The method of claim 1, wherein the second contextual information related to the process includes a priority of the business process as it relates to other processes.

3. The method of claim 1, wherein the request includes a transaction identifier, and wherein the transaction identifier is used to retrieve the first contextual information and the second contextual information.

4. The method of claim 1, wherein the collaboration application is automatically selected from a plurality of collaboration applications, wherein the collaborations applications are ranked by priority by each of the plurality of parties, and wherein the selection of the collaboration application is based upon one or more of: a collaboration preference of the first party, the priority of the plurality of collaboration applications ranked by participants in the collaboration selected from the plurality of parties, and availabilities of the participants in the collaboration session with respect to each collaboration application in the plurality of collaboration applications.

5. The method of claim 1, wherein the collaboration application is selected from a group consisting of: a video conference application, a web conference application, a telephone conference application, and an instant messaging application.

6. The method of claim 1 further comprising:
    identifying, based on a first set of rules, a second party in the plurality of parties that should be included in the collaboration session; and
    sending a request to the second party to join the collaboration session.

7. The method of claim 6, wherein the first set of rules are configured to take into account at least a portion of the first contextual information and the second contextual information.

8. The method of claim 7, wherein the first set of rules are further configured to take into account one or more attributes of the first or second party.

9. The method of claim 8, wherein the one or more attributes are selected from a group consisting of: an identity of the first or second party, a role of the first or second party in the business process, a skill level of the first or second party, a seniority of first or second party, an availability of the first or second party, and a collaboration preference of the first or second party.

10. The method of claim 7, wherein the first set of rules are further configured to match one or more attributes of the first and second parties.

11. The method of claim 7, wherein the first set of rules are user-customizable.

12. The method of claim 6 further comprising determining, based on a second set of rules, a priority for the request sent to the second party.

13. The method of claim 12, wherein the second set of rules are configured to take into account at least a portion of the first contextual information and the second contextual information.

14. The method of claim 13, wherein the second set of rules are further configured to take into account one or more attributes of the first or second party.

15. The method of claim 6 further comprising:
determining an availability of the second party; and
if the second party is not available, creating a collaboration invitation for the second party.

16. The method of claim 15, wherein creating a collaboration invitation comprises creating an appointment in a calendar of the second party, and wherein the appointment includes a reference to at least a portion of the first contextual information and the second contextual information.

17. The method of claim 16, wherein a duration of the appointment is automatically determined based on recorded durations of prior collaboration sessions regarding the transaction or the process.

18. The method of claim 16, wherein the appointment includes a URL link to the collaboration session.

19. The method of claim 6 further comprising:
determining an availability of the second party; and
if the second party is unavailable, creating a recorded inquiry for the second party.

20. The method of claim 1 further comprising storing an audit record of the collaboration session.

21. The method of claim 1, wherein the enterprise application is one of an Enterprise Resource Planning (ERP) application, a Customer Relationship Management (CRM) application, or an Employee Relationship Management (ERM) application.

22. A system for facilitating collaboration between a plurality of parties, each party in the plurality of parties being a participant in transactions of an enterprise application, the system comprising:
a collaboration repository comprising a processing component configured to store first contextual information related to a transaction and identifying a current functional step of a business process executed by the enterprise application and second contextual information including a definition of the business process; and
a collaboration server in communication with the collaboration repository, the collaboration server comprising a processing component configured to:
generate a user interface of enterprise application, the user interface being associated with a current functional step of the business process and being generated in response to completion of a prior functional step of the business process;
receive, from a first party in the plurality of parties, a request to initiate a collaboration session for the transaction, the transaction being an execution instance of the business process, the request being submitted by the first party through a user interface of the enterprise application, wherein the plurality of participants comprises a set of potential participants in the transaction and wherein members of the set of potential participants are maintained dynamically for each transaction and each business process executed by the enterprise application;
retrieve, from the enterprise application, the first contextual information and the second contextual information, wherein the first contextual information related to the transaction includes an audit history of the transaction, the audit history identifying previously completed functional steps and previously involved participants in the transaction for each completed functional step, and wherein members of the set of potential participants are maintained dynamically based on the audit history; and
initiate the collaboration session from the enterprise application executing the business process using the first contextual information and the second contextual information, wherein initiating the collaboration session from the enterprise application executing the business process using the first contextual information and the second contextual information comprises launching a collaboration application, and wherein the collaboration application provides a collaborative workspace providing access to at least a portion of the first contextual information and the second contextual information.

23. The system of claim 22, wherein the collaboration application is selected from a plurality of collaboration applications, wherein the collaboration applications are ranked by priority by each of the plurality of parties, and wherein the selection of the collaboration application is based upon a collaboration preference of the first party, the priority of the plurality of collaboration applications ranked by participants in the collaboration selected from the plurality of parties, and availabilities of the participants in the collaboration session with respect to each collaboration application in the plurality of collaboration applications.

24. A non-transitory machine-readable medium for a computer system, the machine-readable medium having stored thereon a series of instructions which, when executed by a processing component, facilitate collaboration between a plurality of parties, each party in the plurality of parties being a participant in transactions of a business process executed by an enterprise application, by causing the processing component to:
generate a user interface of enterprise application, the user interface being associated with a current functional step of the business process and being generated in response to completion of a prior functional step of the business process;
receive, from a first party in the plurality of parties, a request to initiate a collaboration session for the transaction, the transaction being an execution instance of the business process, the request being submitted by the first party through a user interface of the enterprise application, wherein the plurality of participants comprises a set of potential participants in the transaction and wherein members of the set of potential participants are maintained dynamically for each transaction and each business process executed by the enterprise application;
retrieve, from the enterprise application, the first contextual information and the second contextual information, wherein the first contextual information related to the transaction includes an audit history of the transaction, the audit history identifying previously completed functional steps and previously involved participants in the transaction for each completed functional step, and wherein members of the set of potential participants are maintained dynamically based on the audit history; and
initiate the collaboration session from the enterprise application executing the business process using the first contextual information and the second contextual information, wherein initiating the collaboration session from the enterprise application executing the business process using the first contextual information and the second contextual information comprises launching a collaboration application, and wherein the collaboration application provides a collaborative workspace providing access to at least a portion of the first contextual information and the second contextual information.

25. The non-transitory machine-readable medium of claim 24, wherein the collaboration application is selected from a plurality of collaboration applications, wherein the collaboration applications are ranked by priority by each of the plurality of parties, and wherein the selection of the collaboration application is based upon a collaboration preference of the first party, the priority of the plurality of collaboration applications ranked by participants in the collaboration selected from the plurality of parties, and availabilities of the participants in the collaboration session with respect to each collaboration application in the plurality of collaboration applications.

* * * * *

UNITED STATES PATENT AND TRADEMARK OFFICE
CERTIFICATE OF CORRECTION

| | |
|---|---|
| PATENT NO. | : 8,903,902 B2 |
| APPLICATION NO. | : 11/942917 |
| DATED | : December 2, 2014 |
| INVENTOR(S) | : Niazi |

Page 1 of 1

It is certified that error appears in the above-identified patent and that said Letters Patent is hereby corrected as shown below:

In the Claims

In column 13, line 44, in Claim 1, delete "a the" and insert -- the --, therefor.

Signed and Sealed this
Twenty-eighth Day of July, 2015

Michelle K. Lee
*Director of the United States Patent and Trademark Office*